(No Model.)
F. HEWITT.
ADJUSTABLE WASHER.
No. 550,614. Patented Dec. 3, 1895.
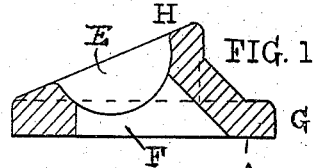
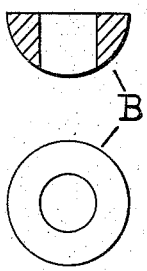
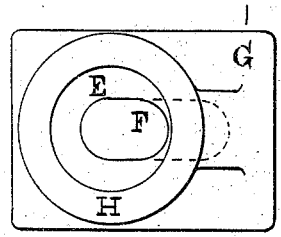
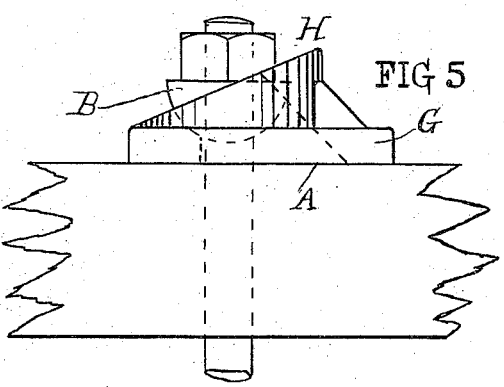
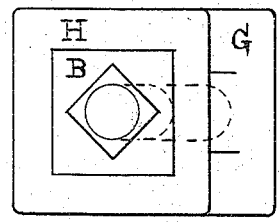
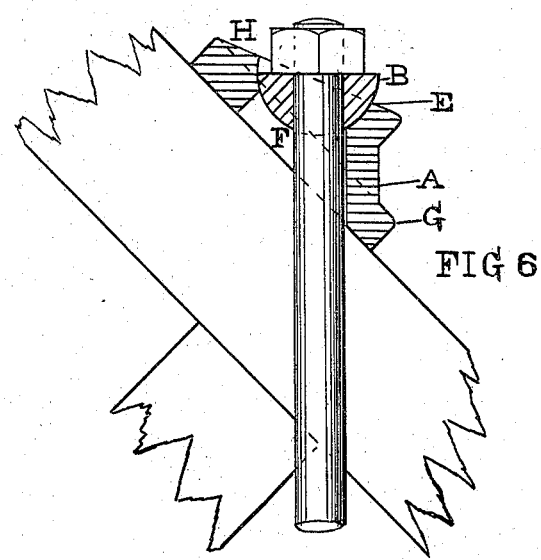
Witnesses
Stephen A. Krom
Rutledge Tomlin
Inventor
Frederic Hewitt

UNITED STATES PATENT OFFICE.

FREDERIC HEWITT, OF NEWARK, NEW JERSEY.

ADJUSTABLE WASHER.

SPECIFICATION forming part of Letters Patent No. 550,614, dated December 3, 1895.

Application filed February 8, 1893. Serial No. 461,514. (No model.)

*To all whom it may concern:*

Be it known that I, FREDERIC HEWITT, a citizen of the United States, residing at Newark, in the county of Essex and State of New Jersey, have invented a new and useful Adjustable Washer for Bolts, of which the following is a specification.

My invention relates to improvements in washers to be placed under the heads or nuts of bolts, and is intended to be used more particularly where the surface on which the washer rests is inclined at an angle to the bolt other than a right angle, as on the inclined timbers of trusses or similar angular work. This washer provides that at whatever angle in relation to the bolts within certain limits the base of the washer may be set the bolt can pass through and that the seat for the bolt-head or nut will adjust itself so that the head or nut will bear fairly onto the washer. It is customary in providing washers for this class of work to make special patterns of angle-washers to suit the particular inclination of the part of the structure upon which it bears.

My invention provides a washer that can be used at any angle, dispensing with the making of special washers for each place.

In the accompanying drawings, Figure 1 is a sectional elevation of the base-piece of the washer. Fig. 2 is a top view of the same. Fig. 3 is a sectional elevation of the adjustable bolt-seat. Fig. 4 is a top view of the same. Fig. 5 is an elevation of the two pieces in combination, showing the relation to bolt and seat for washer when the bolt is vertical and the seat or surface on which the washer rests is horizontal. Fig. 6 is a sectional elevation of the same with the bolt vertical and the surface on which the washer rests inclined at an angle of forty-five degrees. Fig. 7 is a top view of the complete washer when the adjustable seat and the socket in the base are made semicylindrical. In this case the sectional elevation would be the same as in Fig. 1.

Similar letters refer to similar parts in the several views.

This washer, which may be made of cast-iron or other suitable material, has two parts, one, which I call the "base," (shown in Figs. 1 and 2 and marked A,) sets onto the timber or other surface to be bolted. The other part, which I call the "bolt-seat," (shown in Figs. 3 and 4 and marked B,) sets onto the before-mentioned base-piece in a semispherical or cylindrical socket, in which it can turn to accommodate the various angular positions which may be given to the bolt, which passes through both pieces.

The base-piece A in shape consists of a bottom flange G and an upper part H, with a semispherical or cylindrical socket E, into which the bolt-seat B sets. I prefer to make this upper part with its top face more or less inclined to the bottom flange, preferably at an angle intermediate to the angles made by the bolt in its extreme positions, so that the bolt-head or nut may be accessible to the wrench in either position, and also that the bolt-seat B may have a good support under it in either position. This upper part also forms a strengthening-rib across the lower flange to prevent its being broken across the line of the slot by the strain put onto the bolt. The junction between the lower and upper part may be so filled up with metal that the distinction between them may not be apparent. A slot F allows the bolt to pass through. This slot is made of a width sufficient to clear the size of bolt for which the washer is intended, and also to allow of a small amount of angular variation sidewise, and of such length and shape on ends as to enable the bolt to pass through in either of the extreme positions for which the washer is intended to be used. This variation of angle may be more or less, according to the particular use for which the washer is made. As shown in the drawings, it will allow a vertical bolt to be used with a timber or other structure, which is in either a horizontal position or inclined at an angle of forty-five degrees, these limits adapting it to nearly all truss work.

The lower face of bottom flange may be made of any shape to suit it to special work.

The bolt-seat B is made semispherical or cylindrical on the lower surface with a flat seat for the bolt-head or nut on the upper part. A hole through the center allows the bolt to pass through. This hole may be round or square or of any special shape. When either of the latter, it will be to receive either a square or special shape of bolt end to prevent its turning, and generally in connection with the cylindrical form of bolt-seat.

The bolt-seat B, setting in the socket of the base-piece A, and the bolt passing through both pieces will, by its movement in the socket, allow the head of bolt or nut to seat fairly on the same, notwithstanding the angle which the bolt may make with the base within the limits designed.

I am aware that prior to my invention washers have been made of a cylindrical or spherical shape for use under the heads or nuts of bolts or screws. I do not, therefore, make a broad claim to such shape; but

I claim as my invention and desire to secure by Letters Patent—

1. In adjustable washers to be used with bolts the base piece A, having a bottom flange G, a semispherical or cylindrical socket E, the surrounding material of which forms a strengthening rib, inclined upper face H and slot F., in combination with the semispherical or cylindrical piece B.

2. In adjustable washers to be used with bolts, a base piece A. having a bottom flange G., a semispherical or cylindrical socket E the surrounding metal of which forms a strengthening rib, and slot F, in combination with the semispherical or cylindrical piece B.

FREDERIC HEWITT.

Witnesses:
CHARLES S. BENEDICT,
HERBERT W. CHAPMAN.